United States Patent
Yoshida et al.

(10) Patent No.: US 11,946,005 B2
(45) Date of Patent: Apr. 2, 2024

(54) GASIFICATION GAS TREATMENT FACILITY AND GASIFICATION GAS TREATMENT METHOD

(71) Applicant: MITSUBISHI HEAVY INDUSTRIES, LTD., Tokyo (JP)

(72) Inventors: Kaori Yoshida, Kanagawa (JP); Rikio Kan, Hyogo (JP); Seiji Kakesako, Hyogo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 522 days.

(21) Appl. No.: 15/734,746

(22) PCT Filed: Jul. 18, 2019

(86) PCT No.: PCT/JP2019/028187
§ 371 (c)(1),
(2) Date: Dec. 3, 2020

(87) PCT Pub. No.: WO2020/022169
PCT Pub. Date: Jan. 30, 2020

(65) Prior Publication Data
US 2021/0238491 A1    Aug. 5, 2021

(30) Foreign Application Priority Data
Jul. 26, 2018    (JP) ................................ 2018-139965

(51) Int. Cl.
*C10K 1/10*    (2006.01)
(52) U.S. Cl.
CPC .................................... *C10K 1/101* (2013.01)
(58) Field of Classification Search
CPC ........ C10K 1/101; C10K 1/003; C10K 1/004; C10K 1/103; C10K 1/34; C10K 1/002;
(Continued)

(56) References Cited

U.S. PATENT DOCUMENTS 2,720,259 A * 10/1955 Jacoby ................. F28D 7/1669
                                                                      159/44
4,205,963 A * 6/1980 Marion ................... C10K 1/101
                                                                      48/212
(Continued)

FOREIGN PATENT DOCUMENTS

| CN | 1206038 A | 1/1999 |
| CN | 1214358 A | 4/1999 |

(Continued)

OTHER PUBLICATIONS

The Office Action dated Feb. 9, 2023, issued in counterpart EP application No. 19842313.9 (4 pages).
(Continued)

*Primary Examiner* — Christopher P Jones
*Assistant Examiner* — Phillip Y Shao (57) ABSTRACT

A gasification gas treatment facility for treating a gasification gas obtained by gasification of a fuel includes: a first heat exchanger for performing heat exchange between a purified gas obtained by removing at least ammonia and hydrogen chloride from the gasification gas and steam at a saturation temperature; a second heat exchanger for performing heat exchange between the gasification gas and at least condensed water produced by the heat exchange in the first heat exchanger to produce the steam at the saturation temperature; and a circulation system for circulating a circulating fluid including at least one of the steam or the condensed water between the first heat exchanger and the second heat exchanger. The circulation system is configured to supply the circulating fluid including at least the condensed water at the saturation temperature produced in the first heat exchanger to the second heat exchanger.

8 Claims, 5 Drawing Sheets

(58) Field of Classification Search
CPC ............ C10J 3/726; C10J 2300/1653; C10J 2300/1884; C10J 2300/1892; Y02E 20/18
See application file for complete search history.

(56) References Cited

U.S. PATENT DOCUMENTS

2010/0276640 A1 11/2010 Ogino et al.
2011/0203298 A1* 8/2011 Kim .................. F24H 4/04
                                                                                                            62/204
2015/0361363 A1 12/2015 Horizoe et al.

FOREIGN PATENT DOCUMENTS

| CN | 101875484 A | 11/2010 |
|---|---|---|
| CN | 104936678 A | 9/2015 |
| CN | 107325847 A | 11/2017 |
| JP | H11-104451 A | 4/1999 |
| JP | H11-294186 A | 10/1999 |
| JP | 3764568 B2 | 4/2006 |
| JP | 2006-232904 A | 9/2006 |
| JP | 4019202 B2 | 12/2007 |
| JP | 2010-235915 A | 10/2010 |
| JP | 5960069 B2 | 8/2016 |
| JP | 2017-129315 A | 7/2017 |

OTHER PUBLICATIONS

The First Office Action issued in corresponding Chinese Application No. 201980041107.1, dated Aug. 30, 2021 (16 pages).
International Search Report of PCT/JP2019/028187, dated Aug. 27, 2019 (9 pages).
International Preliminary Report on Patentability dated Aug. 27, 2019 in corresponding International (PCT) Application No. PCT/JP2019/028187 (15 pages).

* cited by examiner

GASIFICATION GAS TREATMENT FACILITY AND GASIFICATION GAS TREATMENT METHOD

TECHNICAL FIELD

The present disclosure relates to a gasification gas treatment facility and a gasification gas treatment method.

BACKGROUND

Gasification gas obtained by gasification of fuel (coal, heavy oil, etc.) contains carbon monoxide and hydrogen. Thus, gasification gas can be used in a gasification gas utilizing facility such as a gas turbine. However, gasification gas also contains components such as ammonia and hydrogen chloride due to gasification of fuel. Therefore, it is preferable to remove components such as ammonia and hydrogen chloride by purifying gasification gas before using the gasification gas as fuel, for example.

As the gasification gas purification technique, a technique disclosed in Patent Document 1 is known. Patent Document 1 discloses a treatment facility for a gasification gas produced by gasification of coal and containing ammonia and hydrogen chloride (for example, see paragraph 0019). In this treatment facility, a purified gas is obtained by treatment, such as cleaning, to the gasification gas (for example, see paragraphs 0025 and 0040). The obtained purified gas is heated by heat of the gasification gas in a heat exchanger and then supplied to a gas turbine (for example, see paragraphs 0041 and 0051).

CITATION LIST

Patent Literature

Patent Document 1: JP3764568B

SUMMARY

Problems to be Solved

The temperature of the gasification gas changes depending on the operating state of the gasification gas facility. Herein, the operating state includes the type and composition of fuel and fuel supply amount. When the temperature of the gasification gas is decreased than expected, the amount of heat obtained by heat exchange in the heat exchanger is decreased, so that the purified gas temperature is decreased than expected. As a result, when the purified gas is supplied to, for example, a gas turbine, the operation of the gas turbine becomes unstable due to the low temperature of the purified gas.

The composition of the gasification gas also changes depending on the operating state of the gasification gas facility. For example, when the ammonia concentration and the hydrogen chloride concentration in the gasification gas are high, ammonium chloride is likely to be deposited. Therefore, the gasification gas is preferably maintained at a sufficient temperature in order to suppress the deposition of ammonium chloride. When the gasification gas is cooled in the heat exchanger so that the temperature of the gasification gas reaches the sufficient temperature, the amount of heat supplied to the purified gas decreases, and the temperature of the purified gas decreases. As a result, as in the above case, the operation of the gas turbine becomes unstable.

The present invention was made in view of the above, and an object to be solved by the present invention is to provide a gasification gas treatment facility and a gasification gas treatment method whereby it is possible to suppress the deposition of ammonium chloride while keeping the purified gas at a sufficiently high temperature.

Solution to the Problems (1) According to at least one embodiment of the present invention, a gasification gas treatment facility for treating a gasification gas obtained by gasification of a fuel comprises: a first heat exchanger for performing heat exchange between a purified gas obtained by removing ammonia and hydrogen chloride from the gasification gas and steam at a saturation temperature; a second heat exchanger for performing heat exchange between the gasification gas and at least condensed water produced by the heat exchange in the first heat exchanger; and a circulation system for circulating a circulating fluid including at least one of the steam or the condensed water between the first heat exchanger and the second heat exchanger. The circulation system is configured to supply the circulating fluid including at least the condensed water produced in the first heat exchanger to the second heat exchanger, and is configured to supply the circulating fluid including at least steam produced in the second heat exchanger to the first heat exchanger.

With the above configuration (1), the temperature of the purified gas can be increased by heating the purified gas by steam at a saturation temperature. Further, the latent heat of steam at a saturation temperature is lost by the heating of the purified gas, and the resulting condensed water cools the gasification gas. Thus, the gasification gas can be cooled to a temperature higher than the saturation temperature, so that the temperature of the gasification gas can be stably kept higher than the saturation temperature. Therefore, since the temperature of the gasification gas can be higher than the deposition temperature of ammonium chloride by adjusting the temperature of steam, it is possible to suppress deposition of ammonium chloride. Further, since the circulating fluid is circulated by supplying steam from the second heat exchanger to the first heat exchanger, it is possible to reduce the amount of steam additionally supplied.

(2) In some embodiments, in the above configuration (1), the gasification gas treatment facility comprises: a first steam system for supplying steam to the circulation system; and a condensed water system for extracting the condensed water from the circulation system. The first steam system includes a first flow rate adjustment valve. The condensed water system includes a second flow rate adjustment valve.

With the above configuration (2), the supply amount of steam and the extraction amount of condensed water can be adjusted.

(3) In some embodiments, in the above configuration (1) or (2), the gasification gas treatment facility comprises a steam extraction system for extracting steam from the circulation system. The steam extraction system includes a third flow rate adjustment valve.

With the above configuration (3), when the pressure of the circulation system is higher than a desired pressure, the pressure of the circulation system can be reduced to the desired pressure. Further, the extracted steam can be used in the gasification gas treatment facility. In particular, for example, the extraction amount from the steam turbine can be reduced by use of the extracted steam, so that the power generation efficiency in producing power by the steam turbine can be improved.

(4) In some embodiments, in any one of the above configurations (1) to (3), the gasification gas treatment facility comprises: a third heat exchanger, disposed upstream of the second heat exchanger, for producing steam by heat exchange with the gasification gas; and a second steam system for supplying the steam produced in the third heat exchanger to a steam utilizing facility.

With the above configuration (4), when the temperature of the purified gas is higher than a desired temperature and thus heat is excessive, heat of the gasification gas can be used to generate steam. The produced steam can be used in the gasification gas treatment facility. In particular, for example, the extraction amount from the steam turbine can be reduced by use of the produced steam, so that the power generation efficiency in producing power by the steam turbine can be improved.

(5) In some embodiments, in the above configuration (4), the steam utilizing facility includes the first heat exchanger.

With the above configuration (5), it is possible to reduce the amount of steam supplied from the outside to the first heat exchanger.

(6) In some embodiments, in any one of the above configurations (1) to (5), the saturation temperature is at least 5° C. higher than a deposition temperature of ammonium chloride.

With the above configuration (6), it is possible to more reliably suppress deposition of ammonium chloride.

(7) According to at least one embodiment of the present invention, a gasification gas treatment method for treating a gasification gas obtained by gasification of a fuel comprises: a first heat exchange step of performing heat exchange between a purified gas obtained by removing ammonia and hydrogen chloride from the gasification gas and steam at a saturation temperature by a first heat exchanger; a second heat exchange step of performing heat exchange between the gasification gas and at least condensed water produced by the heat exchange in the first heat exchange step; and a circulation step of supplying a circulating fluid including at least the condensed water produced in the first heat exchanger to the second heat exchanger and supplying a circulating fluid including at least steam produced in the second heat exchanger to the first heat exchanger.

With the above configuration (7), the temperature of the purified gas can be increased by heating the purified gas by steam at a saturation temperature. Further, the latent heat of steam at a saturation temperature is lost by the heating of the purified gas, and the resulting condensed water cools the gasification gas. Thus, the gasification gas can be cooled to a temperature higher than the saturation temperature, so that the temperature of the gasification gas can be stably kept higher than the saturation temperature. Therefore, since the temperature of the gasification gas can be higher than the deposition temperature of ammonium chloride by adjusting the temperature of steam, it is possible to suppress deposition of ammonium chloride. Further, since the circulating fluid is circulated by supplying steam from the second heat exchanger to the first heat exchanger, it is possible to reduce the amount of steam additionally supplied.

(8) In some embodiments, in the above method (7), the second heat exchanger includes a housing having an interior space for storing the condensed water, and a heat transfer tube through which the gasification gas flows, the heat transfer tube being exposed to the interior space. The gasification gas treatment method comprises: a condensed water production step of producing condensed water at a saturation temperature by heat exchange with steam in the first heat exchanger; and a storage step of storing the condensed water produced in the condensed water production step in the interior space of the second heat exchanger up to a reference water level.

With the above method (8), at startup operation of the gasification gas treatment facility, condensed water at a saturation temperature can be stored in the interior space of the second heat exchanger up to the reference water level. Thus, the temperature of the second heat exchanger can be rapidly increased to the saturation temperature of the condensed water, so that the startup time can be shortened.

(9) In some embodiments, in the above method (8), the gasification gas treatment method comprises: a steam production step of producing steam by a steam producing facility; and a steam supply step of supplying the produced steam to the first heat exchanger.

With the above method (9), steam produced by the steam producing facility can be supplied to the first heat exchanger.

(10) In some embodiments, in any one of the above methods (7) to (9), the circulation step includes controlling an amount of the circulating fluid flowing through a circulation system so that a pressure of the circulation system is equal to or greater than a reference pressure.

With the above method (10), the pressure of the circulation system can be higher than the reference pressure, and the saturation temperature of the circulating fluid can be increased.

Advantageous Effects

At least one embodiment of the present invention provides a gasification gas treatment facility and a gasification gas treatment method whereby it is possible to suppress the deposition of ammonium chloride while keeping the purified gas at a sufficiently high temperature.

DETAILED DESCRIPTION

Embodiments of the present invention will now be described in detail with reference to the accompanying drawings. However, the following embodiments and the drawings are illustrative only, and various modifications may be applied as long as they do not depart from the object of the present invention. Further, two or more embodiments may be optionally combined in any manner. Further, in the following embodiments, similar elements will be indicated by the same reference numerals, and redundant descriptions thereof will be omitted for convenience.

It is intended, however, that unless particularly specified, dimensions, materials, shapes, relative positions and the like of components described in the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

Figure 1:
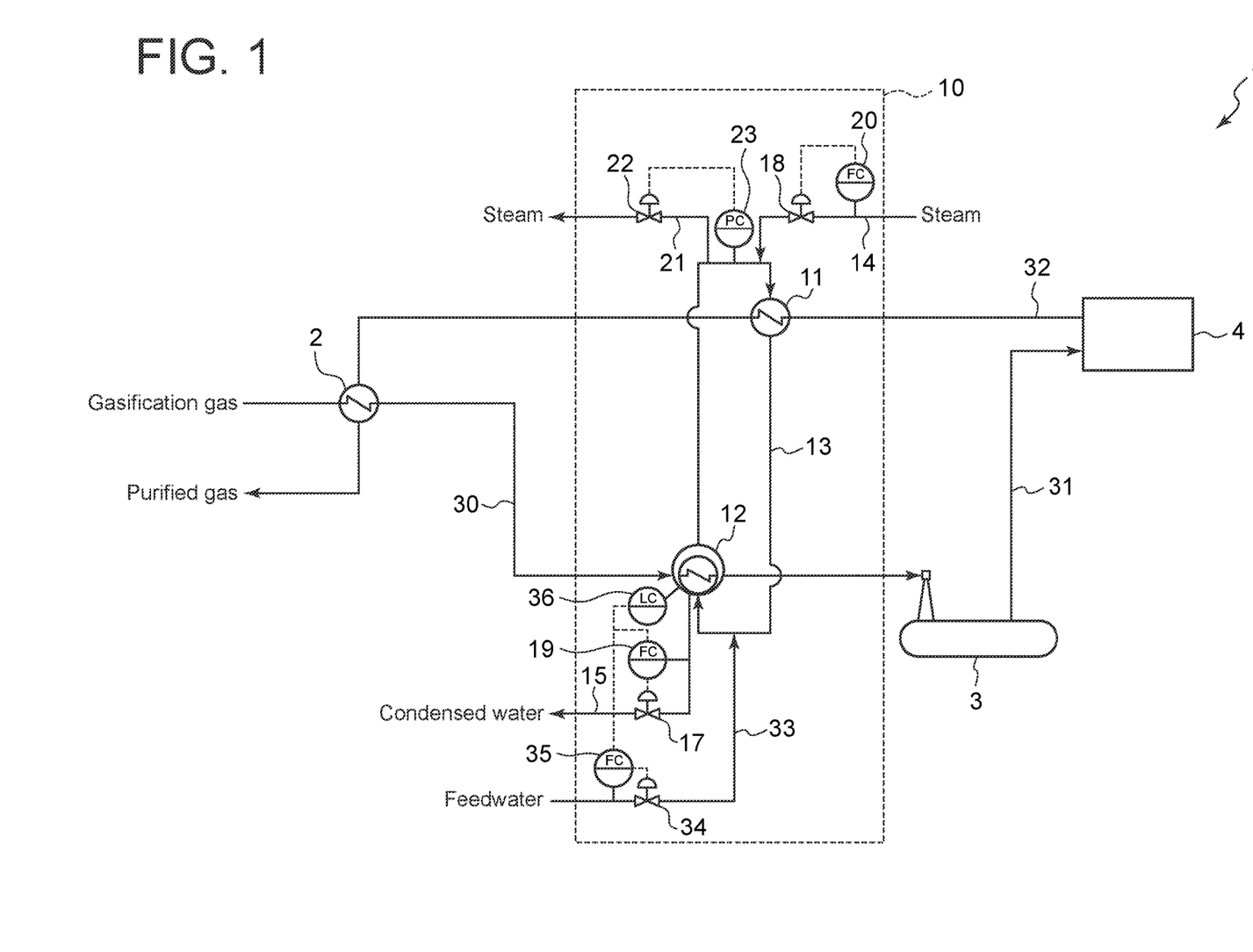
FIG. 1 is a system diagram of a gasification gas treatment facility according to a first embodiment of the present invention.

FIG. 1 is a system diagram of a gasification gas treatment facility 1 according to a first embodiment of the present invention. The treatment facility 1 is configured to treat a gasification gas obtained by gasification of fuel such as coal or heavy oil. The gasification of fuel is performed in a gasification facility (not shown) such as a fluidized bed furnace. The treatment of the gasification gas is performed by removing nitrogen components and sulfur components such as carbonyl sulfide, ammonia, and hydrogen chloride from the gasification gas. The treatment of the gasification gas yields a purified gas including hydrogen and carbon monoxide. The purified gas is supplied to, for example, a gasification gas utilizing facility such as a gas turbine.

The treatment facility 1 includes a heating facility 10 for heating the purified gas by using heat of the gasification gas, a cleaning facility 3 for cleaning the gasification gas, and a hydrogen sulfide absorbing facility 4. First, the overall configuration of the gasification gas treatment facility 1 will be described focusing on the gas flow, and then the configuration of the heating facility 10 of the treatment facility 1 will be described.

The gasification gas produced in a gasification facility (not shown) is supplied to a heat exchanger 2 through a gasification gas system 30. The heat exchanger 2 includes a gas-gas heat exchanger, for example. The temperature of the gasification gas may be for example about 300° C. to 500° C. In the heat exchanger 2, the purified gas is heated to about 250° C. to 350° C. by heat of the gasification gas. Due to this heating, the temperature of the gasification gas is decreased to, for example, about 200° C. to 300° C. The gasification gas with the decreased temperature is supplied to a COS converter (not shown) upstream of a second heat exchanger 12 (described later) in the gasification gas system 30. The COS converter includes a conversion catalyst (not shown) and converts carbonyl sulfide in the gasification gas into hydrogen sulfide with the conversion catalyst. The conversion into hydrogen sulfide can be performed, for example, at about 200° C. to 400° C.

The gasification gas including the produced hydrogen sulfide is supplied to a second heat exchanger 12 of the heating facility 10 through the gasification gas system 30. In the second heat exchanger 12, heat exchange is performed between the gasification gas and condensed water at a saturation temperature produced in a first heat exchanger 11 described later. As a result, the condensed water is heated and undergoes a phase change to steam, and the gasification gas is cooled, so that the temperature of the gasification gas is decreased. Specifically, the temperature of the gasification gas is decreased to a saturation temperature at the pressure of a circulation system 13. For example, when the pressure of the circulation system 13 is about 3.0 MPaG, the temperature of the gasification gas at the outlet of the second heat exchanger 12 is about 250° C. to 280° C. Accordingly, in this case, the second heat exchanger 12 functions as a cooler for cooling the gasification gas.

Although details will be described later, in the first heat exchanger 11 of the heating facility 10, the purified gas is heated to a saturation temperature at the pressure of the circulation system 13 by heat of the gasification gas and heat of steam supplied through a first steam system 14. In this case, the first heat exchanger 11 functions as a heater for heating the purified gas. During the heating, the latent heat of the steam is removed, so that at least a part of the steam is condensed, and condensed water at a saturation temperature is produced. Further, the condensed water at a saturation temperature produced in the first heat exchanger 11 is supplied to the second heat exchanger 12 as described above.

The gasification gas after heat exchange in the second heat exchanger 12 is supplied to the cleaning facility 3 through the gasification gas system 30. The cleaning facility 3 includes, for example, a scrubber, in which the gasification gas comes into contact with scrubbing water to remove ammonia and hydrogen chloride in the gasification gas. Further, a part of hydrogen sulfide in the gasification gas is dissolved in scrubbing water. The removed ammonia and hydrogen chloride are dissolved in scrubbing water, and the dissolved ammonia, hydrogen chloride, and hydrogen sulfide are treated in a treating device (not shown).

The gasification gas after removing ammonia etc., is cooled to, for example 40° C., and is supplied to the hydrogen sulfide absorbing facility 4 through the gasification gas system 31. The hydrogen sulfide absorbing facility 4 includes, for example, a tower, in which the gasification gas comes into contact with an amine aqueous solution to remove hydrogen sulfide in the gasification gas.

The purified gas obtained by removing hydrogen sulfide from the gasification gas is supplied to the first heat exchanger 11 of the heating facility 10 through a purified gas system 32. In the heating facility 10, as described above, the purified gas is heated to, for example, about 250° C. by heat of the gasification gas and heat of steam supplied through a first steam system 14 (described later). The heated purified gas is supplied to the heat exchanger 2 through the purified gas system 32 and is heated to about 250° C. to 350° C. by heat of the gasification gas, as described above. Then, the heated purified gas is supplied to a gasification gas utilizing facility (not shown) such as a gas turbine.

The heating facility 10 for heating the purified gas in the treatment facility 1 includes a first heat exchanger 11, a second heat exchanger 12, and a circulation system 13. In the following description, facilities and systems included in the heating facility 10 are facilities and systems included in the treatment facility 1.

The first heat exchanger 11 is configured to perform heat exchange between a purified gas obtained by removing at least ammonia and hydrogen chloride (in the first embodiment of the present invention, further hydrogen sulfide, for example) from the gasification gas and steam at a saturation temperature. Specifically, the purified gas is heated by steam at a saturation temperature. Due to the heating of the purified gas, the latent heat of the steam is removed, so that the steam is condensed, and condensed water is produced. Herein, the saturation temperature is, for example, a temperature at least 5° C. higher, preferably at least 10° C. or higher, more preferably 20° C. or higher than the deposition temperature of ammonium chloride. When the saturation temperature is such a temperature, it is possible to more reliably suppress deposition of ammonium chloride.

The second heat exchanger 12 is configured to perform heat exchange between the gasification gas and at least condensed water produced by the above-described heat exchange. Specifically, the condensed water at a saturation temperature is heated by heat of the gasification gas. As a result, the condensed water at a saturation temperature undergoes a phase change, so that steam at a saturation temperature is produced.

The first heat exchanger 11 includes a gas-gas heat exchanger, for example. The second heat exchanger 12 includes a so-called kettle type heat exchanger, for example. The structure of the second heat exchanger 12 will be described with reference to FIG. 2.

Figure 2:
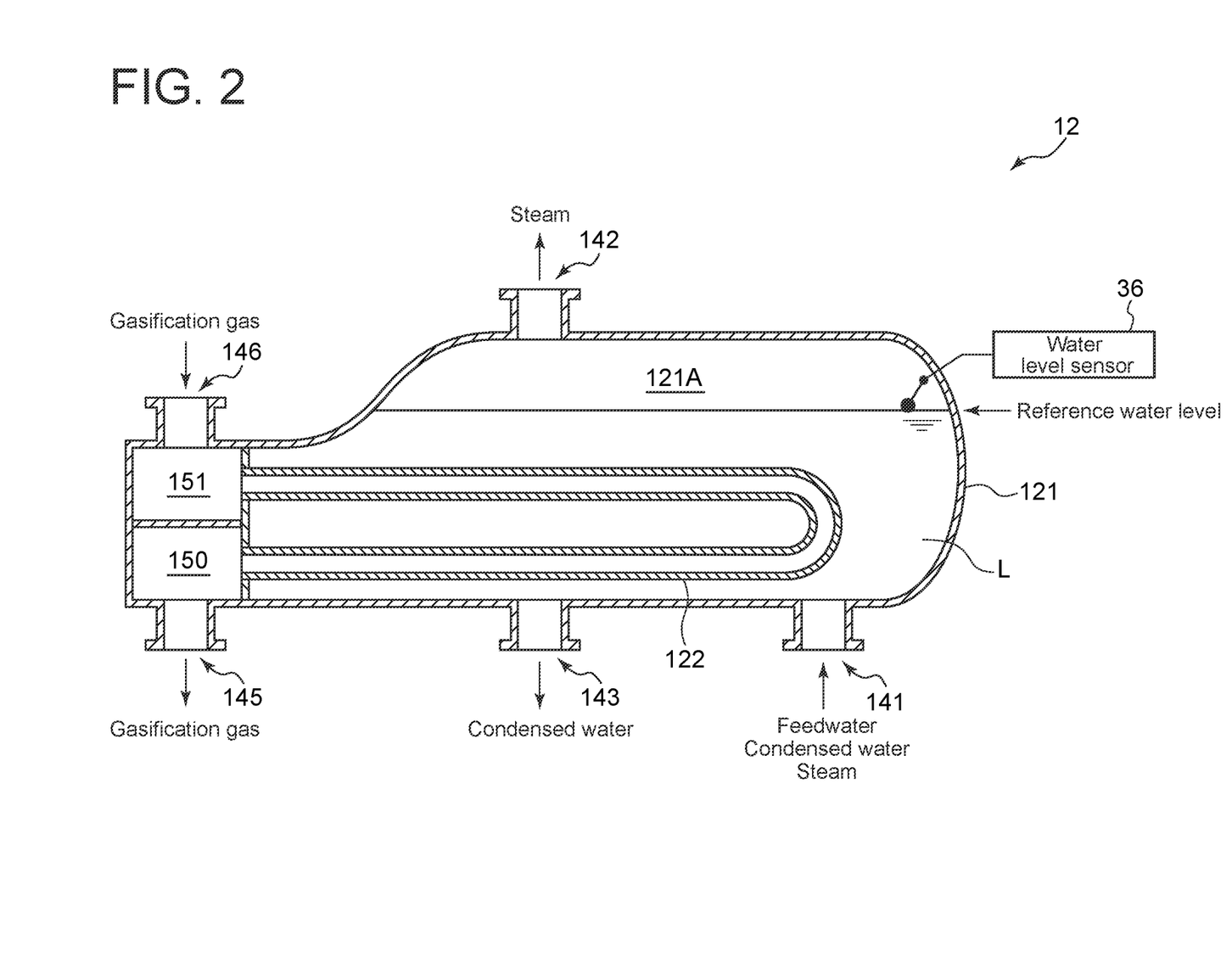
FIG. 2 is a cross-sectional view of a second heat exchanger of the treatment facility shown in FIG. 1.

FIG. 2 is a cross-sectional view of the second heat exchanger 12 of the treatment facility 1 shown in FIG. 1. The structure of the second heat exchanger 12 is not limited to the illustrated example, and the structure can be freely changed; for instance, the position of an inlet 141 may be upside down.

The second heat exchanger 12 includes a housing 121 having an interior space 121A for storing condensed water which has been produced in the first heat exchanger 11 and flowed through a circulation system 13 (described later), and a heat transfer tube 122 through which the gasification gas flows and which is exposed to the interior space 121A. The housing 121 is shaped such that the lower surface extends in the horizontal direction, and a part of the upper surface protrudes upward.

The upper surface of the housing 121 has an outlet 142 for discharging steam and an inlet 146 for introducing the gasification gas to be used for heat exchange. Further, the lower surface of the housing 121 has an inlet 141 for introducing feedwater, condensed water, and steam to the interior space 121A, an outlet 143 for discharging them from the interior space 121A, and an outlet 145 for discharging the gasification gas after heat exchange. Among them, the circulation system 13 (see FIG. 1) is configured by including the inlet 141, the outlet 142, and the internal space 121A. The outlet 143 is connected to a condensed water system 15 (see FIG. 1). Further, the gasification gas system 30 is configured by including the space 151, the heat transfer tube 122, the space 150, and the outlet 145.

The second heat exchanger 12 includes a water level sensor 36 for measuring the water level of condensed water L stored in the interior space 121A. At normal operation of the treatment facility 1 (i.e., at normal operation of heating facility 10), if the water level measured by the water level sensor 36 is lower than a reference water level, a flow rate adjustment valve 34 of a feedwater system 33 is opened to supply feedwater such that the water level is equal to the reference water level. The supply amount control of feedwater is performed by feedback control based on the flow rate measured by a flow rate meter 35. If the water level measured by the water level sensor 36 is higher than the reference water level, condensed water L is extracted through a discharge system (not shown) such that the water level is equal to the reference water level.

The reference water level is set at a position where the entire heat transfer tube 122 is immersed. Therefore, the gasification gas introduced into the space 151 through the inlet 146 exchanges heat with condensed water L at a saturation temperature while flowing through the heat transfer tube 122. Further, the gasification gas after heat exchanger is discharged to the outside of the second heat exchanger 12 through the space 150 and the outlet 145.

Referring to FIG. 1 again, the circulation system 13 is configured to circulate a circulating fluid including at least one of steam or condensed water between the first heat exchanger 11 and the second heat exchanger 12. More specifically, the circulation system 13 is configured to supply a circulating fluid including at least condensed water produced in the first heat exchanger 11 to the second heat exchanger 12. Further, the circulation system 13 is configured to supply a circulating fluid including at least steam produced in the second heat exchanger 12 to the first heat exchanger 11.

The circulating fluid circulating in the circulation system 13 has a saturation temperature at the pressure of the circulation system 13. Further, the circulation system 13 is configured such that the pressure in the system is constant (for example, about 3.0 MPaG) by supply of steam to the circulation system 13 and discharge of steam from the circulation system 13.

With the first heat exchanger 11, the second heat exchanger 12, and the circulation system 13, the temperature of the purified gas can be increased by heating the purified gas by steam at a saturation temperature. Further, the latent heat of steam at a saturation temperature is lost by the heating of the purified gas, and the resulting condensed water cools the gasification gas. Thus, the gasification gas can be cooled to a temperature higher than the saturation temperature, so that the temperature of the gasification gas can be stably kept higher than the saturation temperature. Therefore, since the temperature of the gasification gas can be higher than the deposition temperature of ammonium chloride by adjusting the temperature of steam, it is possible to suppress deposition of ammonium chloride. Further, since the circulating fluid is circulated by supplying steam from the second heat exchanger to the first heat exchanger, it is possible to reduce the amount of steam additionally supplied.

The heating facility 10 includes the first steam system 14 for supplying steam to the circulation system 13, and the condensed water system 15 for extracting condensed water from the circulation system 13 as blow-down water. Among them, the condensed water system 15 is connected to the outlet 143 (see FIG. 2) of the second heat exchanger 12. Thus, condensed water flowing through the circulation system 13 is extracted to the outside through the second heat exchanger 12 and the outlet 143.

The first steam system 14 includes a first flow rate adjustment valve 18, and the condensed water system 15 includes a second flow rate adjustment valve 17. With the first flow rate adjustment valve 18 and the second flow rate adjustment valve 17, the supply amount of steam and the extraction amount of condensed water can be adjusted.

The supply of steam to the circulation system 13 through the first steam system 14 is controlled such that the flow rate measured by a flow rate meter 20 is constant. The steam supply amount control is performed by opening degree control of the first flow rate adjustment valve 18. Further, the extraction of condensed water from the circulation system 13 is also controlled such that the flow rate measured by a flow rate meter 19 is constant. The condensed water extraction amount control is performed by opening degree control of the second flow rate adjustment valve 17.

The heating facility 10 further includes a steam extraction system 21 for extracting steam from the circulation system 13. The steam extraction system 21 includes a third flow rate adjustment valve 22. Further, the heating facility 10 includes a pressure gauge 23 for measuring the pressure of the circulation system 13. The pressure of the circulation system 13 is controlled to be constant such that the pressure measured by the pressure gauge 23 is constant.

With the steam extraction system 21 and the third flow rate adjustment valve 22, when the pressure of the circulation system 13 is higher than a desired pressure, the pressure of the circulation system 13 can be reduced to the desired pressure. Further, the extracted steam can be used in the gasification gas treatment facility 1. In particular, for example, the extraction amount from the steam turbine can be reduced by use of the extracted steam, so that the power generation efficiency in producing power by the steam turbine can be improved. When the pressure of the circulation system 13 is lowered, control is performed to increase the amount of steam supplied through the first steam system 14.

The control of the treatment facility 1 including the heating facility 10 is performed by an arithmetic control unit (not shown). The arithmetic control device includes a central processing unit (CPU), a random access memory (RAM), a read only memory (ROM), a hard disk drive (HDD), and a control circuit, not depicted, and is realized by executing a predetermined control program stored in the ROM by the CPU.

Figure 3:
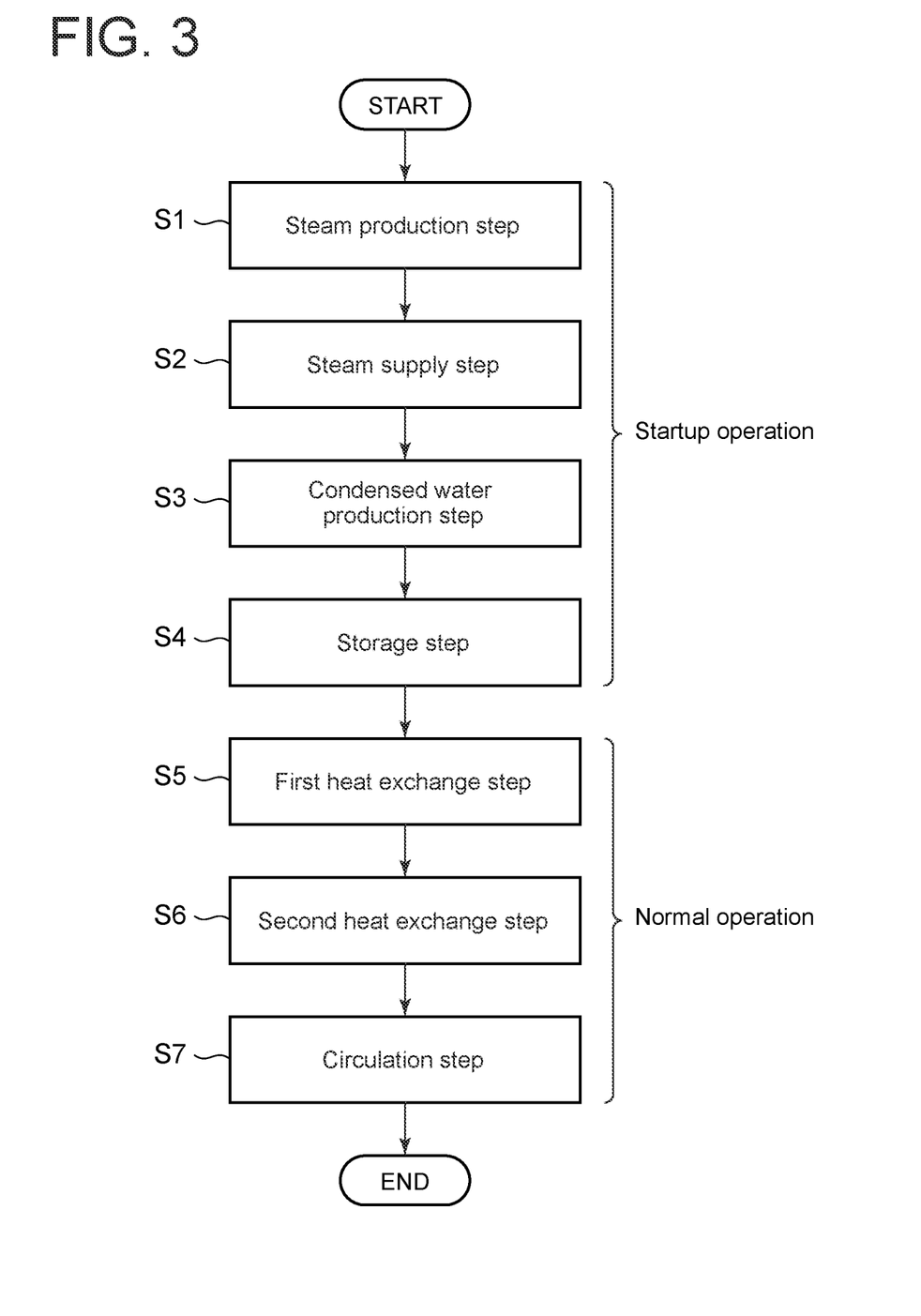
FIG. 3 is a flowchart of a gasification gas treatment method according to a first embodiment of the present invention.

FIG. 3 is a flowchart of a gasification gas treatment method according to a first embodiment of the present invention. Hereinafter, the gasification gas treatment method according to the first embodiment of the present invention is simply referred to as "treatment method of first embodiment". The treatment method of the first embodiment can be performed with the treatment facility shown in FIG. 1, for example. Therefore, in the following description, FIGS. 1 and 2 are referred as appropriate.

The treatment method of the first embodiment is a method of treating a gasification gas obtained by gasification gas of fuel. The treatment method of the first embodiment includes a steam production step S1, a steam supply step S2, a condensed water production step S3, a storage step S4, a first heat exchange step S5, a second heat exchange step S6, and a circulation step S7. Among them, the steam production step S1, the steam supply step S2, the condensed water production step S3, and the storage step S4 are performed at startup operation of the treatment facility 1. The first heat exchange step S5, the second heat exchange step S6, and the circulation step S7 are performed at normal operation of the treatment facility 1.

The normal operation and startup operation will now be described.

The treatment facility 1 (see FIG. 1) is installed, for example, as a part of an integrated coal gasification combined cycle (IGCC). Further, a gasification gas produced by a gasifier (gasification facility) of the IGCC is purified as described above to obtain a purified gas. The obtained purified gas is supplied to a gas turbine (gasification gas utilizing facility) of the IGCC to generate power. Further, exhaust heat of the gas turbine is recovered by a heat recovery steam generator to produce steam. The produced steam is supplied to a steam turbine to generate power. Herein, the state where power is constantly generated by the gas turbine and the steam turbine corresponds to normal operation. Accordingly, during normal operation, the gasification gas produced by the gasifier is purified in the treatment facility 1.

On the other hand, execution of normal operation from the state where the operation is stopped due to, for example, maintenance requires startup operation of the IGCC including the treatment facility 1. As startup operation, specifically, pre-operation preparation (e.g., start of power supply to various facilities) is performed in each constituent facility of the IGCC other than the treatment facility 1 (e.g., gasifier, gas turbine, steam turbine; hereinafter referred to as "main engine" (not shown)). Further, in the treatment facility 1, for example, pre-operation preparation of various facilities (e.g., start of circulation of circulating fluid by steam injection into circulation system 13, start of power supply to various facilities) is performed. Thereby, in the circulation system 13, the circulation of the circulating fluid at a saturation temperature (including at least one of steam or condensed water) starts.

Then, in the main engine, the steam turbine is started, and the gas turbine is ignited. Meanwhile, in the treatment facility 1, the gasification gas systems 30 and 31 and the purified gas system 32 are pressurized by supplying compressed air using a compressor (not shown). Then, the gasifier included in the main engine is ignited. Fuel used for ignition in the gasifier may be auxiliary fuel such as kerosene or light oil at startup. Combustion of the auxiliary fuel in the gasifier produces a gas-purification gas having a relatively low temperature (for example, about 100° C.). By flowing the purified gas-purification gas through the gasification gas systems 30, 31 and the purified gas system 32, the temperature of the gasification gas systems 30, 31 and the purified gas system 32 is increased.

However, the temperature of the gas-purification gas is a relatively low temperature, as described above. Accordingly, in this case, the second heat exchanger 12 functions as a heater for heating the gas-purification gas. Thus, when heat exchange is performed between the circulation system 13 through which the circulating fluid at a saturation temperature and each of the first heat exchanger 11 and the second heat exchanger 12, steam supplied to the circulation system 13 changes into condensed water in each heat exchanger. The condensed water produced in the first heat exchanger 11 and the second heat exchanger 12 is stored in the interior space 121A of the second heat exchanger 12 described above with reference to FIG. 2 (details will be described later with reference to FIG. 4).

In the first heat exchanger 11, the gas-purification gas is heated by the circulating fluid including steam supplied through the first steam system 14. As a result, the temperature of the gas-purification gas supplied to the gasification gas utilizing facility (e.g., gas turbine) through the purified gas system 32 is rapidly increased. Thus, the startup time can be shortened.

When the temperature of the gas-purification gas is sufficiently increased by heating in the first heat exchanger 11, fuel combusted in the gasifier is changed to coal. Accordingly, in the gasifier, due to combustion of coal, the gasification gas (e.g., about 300° C. to 500° C. as described above) at a temperature higher than the gas-purification gas starts to be produced. The produced gasification gas starts to flow through the gasification gas systems 30, 31 and the purified gas system 32, and the temperature of the gasification gas systems 30, 31 and the purified gas system 32 is further increased. Then, the amount of coal to be combusted is increased to increase the load, and startup operation is completed at the time when the load reaches a desired value.

After completion of startup operation, the above-described normal operation is performed.

In the treatment method of the first embodiment shown in FIG. 3, the steam production step S1 is a step of producing steam by a steam producing facility (not shown) such as an auxiliary boiler. The steam supply step S2 is a step of supplying the produced steam to the first heat exchanger 11. Through the steam production step S1 and the steam supply step S2, the steam produced by the steam producing facility such as an auxiliary boiler is supplied to the first heat exchanger 11.

The condensed water production step S3 is a step of producing condensed water at a saturation temperature by heat exchange with steam in the first heat exchanger 11. The saturation temperature has the same meaning as the saturation temperature described above with reference to FIG. 1. The storage step S4 is a step of storing the condensed water produced in the condensed water production step S3 in the interior space 121A (see FIG. 2) of the second heat exchanger 12 up to the reference water level. The condensed water produced in the condensed water production step S3 passes through the circulation system 13 and is introduced from the inlet 141 (see FIG. 2) of the housing 121 into the interior space 121A. The storage step S4 will now be described with reference to FIG. 4.

Figure 4:
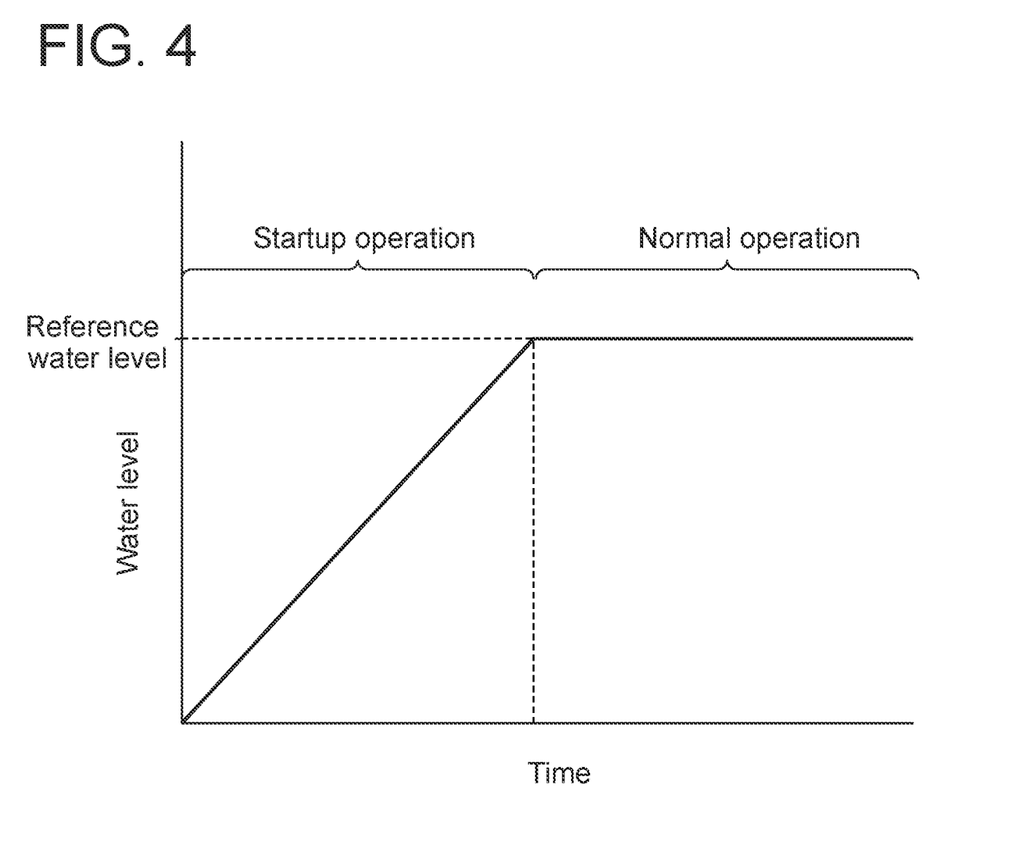
FIG. 4 is a graph showing water level changes in the second heat exchanger in the storage step.

FIG. 4 is a graph showing water level changes in the second heat exchanger 12 in the storage step S4. However, this graph is schematic, and the actual water level does not necessarily match the shape of the graph.

In the storage step S4, condensed water at a saturation temperature produced by heat exchange with steam in the first heat exchanger 11 is stored in the interior space 121A of the second heat exchanger 12. In addition, as described above, since condensed water is also produced in the second heat exchanger 12, the condensed water produced in the second heat exchanger 12 is also stored in the second heat exchanger 12. Thus, at startup operation, as at least the condensed water produced in the first heat exchanger 11 is stored, the water level (measured by water level sensor 36) in the interior space 121A rises.

After completion of startup operation, at normal operation, as described above, a fixed amount of steam is supplied to the circulation system 13, and a fixed amount of condensed water is extracted from the internal space 121A. Thus, normal operation is performed such that the water level in the interior space 121A is constant at the reference water level.

Through the condensed water production step S3 and the storage step S4, at startup operation of the gasification gas treatment facility, condensed water at a saturation temperature can be stored in the interior space 121A of the second heat exchanger 12 up to the reference water level. Thus, the temperature of the second heat exchanger 12 can be rapidly increased to the saturation temperature of the condensed water, so that the startup time can be shortened. At startup operation, the second heat exchanger 12 functions as a heater for heating the gasification gas.

Referring to FIG. 3 again, the first heat exchange step S5 is a step of performing heat exchange between a purified gas obtained by removing at least ammonia and hydrogen chloride (in the first embodiment of the present invention, further hydrogen sulfide, for example) from the gasification gas and steam at a saturation temperature by the first heat exchanger 11. The second heat exchange step S6 is a step of performing heat exchange between the gasification gas and at least condensed water produced by the heat exchange in the first heat exchange step S5 by the second heat exchanger 12. The circulation step S7 is a step of supplying a circulating fluid including at least the condensed water produced in the first heat exchanger 11 to the second heat exchanger 12 and supplying a circulating fluid including at least steam produced in the second heat exchanger 12 to the first heat exchanger 11. The supply of the circulating fluid to the first heat exchanger 11 is performed through the circulation system 13.

Through the first heat exchange step S5, the second heat exchange step S6, and the circulation step S7, the temperature of the purified gas can be increased by heating the purified gas by steam at a saturation temperature. Further, the latent heat of steam at a saturation temperature is lost by the heating of the purified gas, and the resulting condensed water cools the gasification gas. Thus, the gasification gas can be cooled to a temperature higher than the saturation temperature, so that the temperature of the gasification gas can be stably kept higher than the saturation temperature. Therefore, since the temperature of the gasification gas can be higher than the deposition temperature of ammonium chloride by adjusting the temperature of steam, it is possible to suppress deposition of ammonium chloride. Further, since the circulating fluid is circulated by supplying steam from the second heat exchanger to the first heat exchanger, it is possible to reduce the amount of steam additionally supplied.

In the treatment method of the first embodiment, the circulation step S7 includes controlling the amount of the circulating fluid (including at least one of steam or condensed water) flowing through the circulation system 13 so that the pressure of the circulation system 13 is equal to or greater than a reference pressure. With this method, the pressure of the circulation system 13 can be higher than the reference pressure, and the saturation temperature of the circulating fluid can be increased.

Figure 5:
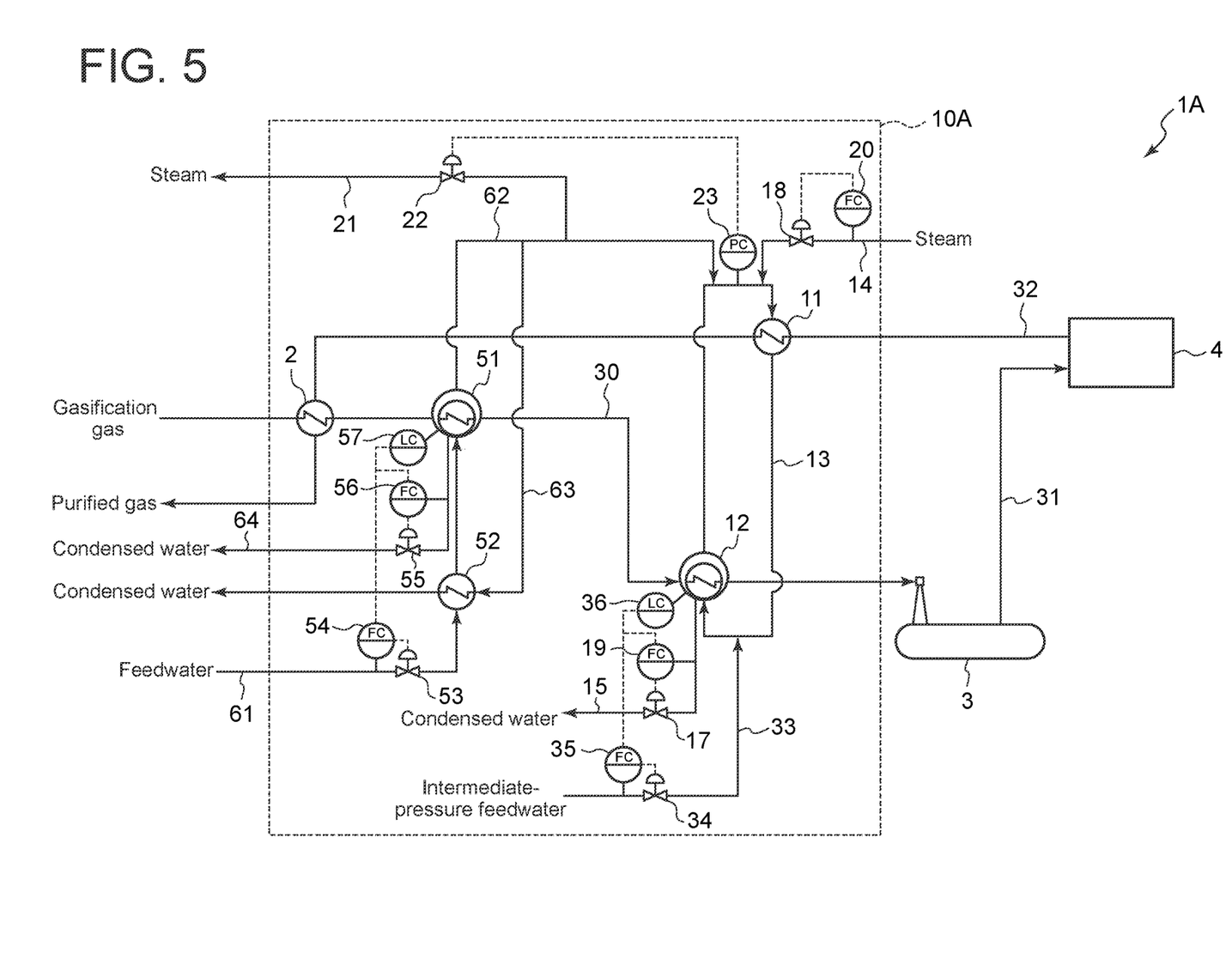
FIG. 5 is a system diagram of a gasification gas treatment facility according to a second embodiment of the present invention.

FIG. 5 is a system diagram of a gasification gas treatment facility 1A according to a second embodiment of the present invention. The treatment facility 1A includes a heating facility 10A, as in the treatment facility 1 described above. However, the treatment facility 1A includes, in addition to the configuration of the heating facility 10, a third heat exchanger 51, disposed upstream of the second heat exchanger 12, for producing steam by heat exchange with the gasification gas; and a second steam system 62 for supplying the steam produced in the third heat exchanger 51 to a steam utilizing facility (first heat exchanger 11 and steam turbine (not shown)).

There is a case where a required value of the temperature of the purified gas supplied to the gasification gas utilizing facility such as the gas turbine is lower than usual. In this case, the temperature of the purified gas supplied to the gasification gas utilizing facility satisfies the required value, and heat of the gasification gas is excessive. Accordingly, heat of the gasification gas can be used for other than heating of the purified gas. In this case, heat of the gasification gas is recovered in the third heat exchanger 51, and steam is produced by the recovered heat.

The third heat exchanger 51 includes a so-called kettle type heat exchanger, for example, like the second heat exchanger 12 (see FIG. 2). Accordingly, the third heat exchanger 51 is connected to a feedwater system 61 for supplying feedwater to the interior space (not shown) of the housing of the third heat exchanger 51 and a condensed water system 64 for extracting condensed water stored in the third heat exchanger 51. The supply of feedwater by the feedwater system 61 is performed by opening a flow rate adjustment valve 53 included in the feedwater system 61.

The supply amount control of feedwater is performed by feedback control based on the flow rate measured by a flow rate meter 54. Further, the extraction of condensed water by the condensed water system 64 is controlled such that the flow rate measured by a flow rate meter 56 is constant. The condensed water extraction amount control is performed by opening degree control of a fourth flow rate adjustment valve 55.

The third heat exchanger 51 includes a water level sensor 57 for measuring the water level of condensed water stored in the interior space. At normal operation of the treatment facility 1A (i.e., at normal operation of heating facility 10), if the water level measured by the water level sensor 57 is lower than the reference water level, feedwater is supplied as described above such that the water level is equal to the reference water level. If the water level measured by the water level sensor 57 is higher than the reference water level, condensed water is extracted through a discharge system (not shown) such that the water level is equal to the reference water level.

With the third heat exchanger 51 and the second steam system 62, when the temperature of the purified gas is higher than a desired temperature and thus heat is excessive, heat of the gasification gas can be used to generate steam. The produced steam can be used in the gasification gas treatment facility 1. In particular, for example, the extraction amount from the steam turbine can be reduced by use of the produced steam, so that the power generation efficiency in producing power by the steam turbine can be improved.

The steam utilizing facility supplied with steam produced in the third heat exchanger 51 includes the treatment facility 1 and the first heat exchanger 11. Therefore, steam produced in the third heat exchanger 51 is supplied to, in addition to facilities in the plant through the steam extraction system 21, the first heat exchanger 11 through the second steam system 62 and the circulation system 13. Since the steam produced in the third heat exchanger 51 is supplied to the first heat exchanger 11, it is possible to reduce the amount of steam supplied from the outside to the first heat exchanger 11.

Further, the steam produced in the third heat exchanger 51 is also used for heating feedwater supplied to the third heat exchanger 51. Specifically, a third steam system 63 is branch from and connected to the second steam system 62. The third steam system 63 includes a feedwater heater 52. The feedwater heater 52 heats feedwater by heat of steam. On the other hand, the steam losing heat is converted into steam with decrease in temperature and is discharged to the outside. The heated feedwater is supplied to the third heat exchanger 51 through the feedwater system 61, and the water level in the third heat exchanger 51 is recovered.

With the treatment facility 1A having the above configuration, as with the treatment facility 1 described above, it is possible to suppress deposition of ammonium chloride while keeping the purified gas at a sufficiently high temperature.

REFERENCE SIGNS LIST 1, 1A Treatment facility
2 Heat exchanger
3 Cleaning facility
4 Hydrogen sulfide absorbing facility
10, 10A Heating facility
11 First heat exchanger
12 Second heat exchanger
13 Circulation system
14 First steam system
15, 64 Condensed water system
17 Second flow rate adjustment valve
18 First flow rate adjustment valve
19, 20, 35, 54, 56 Flow rate meter
21 Steam extraction system
22 Third flow rate adjustment valve
23 Pressure gauge
30, 31 Gasification gas system
32 Purified gas system
33, 61 Feedwater system
34, 53 Flow rate adjustment valve
36, 57 Water level sensor
51 Third heat exchanger
52 Feedwater heater
55 Fourth flow rate adjustment valve
62 Second steam system
63 Third steam system
121 Housing
121A Interior space
122 Heat transfer tube
141, 146 Inlet
142, 143, 145 Outlet
150, 151 Space
L Condensed water
S1 Steam production step
S2 Steam supply step
S3 Condensed water production step
S4 Storage step
S5 First heat exchange step
S6 Second heat exchange step
S7 Circulation step

The invention claimed is:

1. A gasification gas treatment facility for treating a gasification gas obtained by gasification of a fuel, comprising:
   a cleaning facility that produces a purified gas by making the gasification gas come into contact with scrubbing water;
   a first heat exchanger for performing heat exchange between the purified gas and steam;
   a second heat exchanger for performing heat exchange between the gasification gas and at least condensed water produced by the heat exchange in the first heat exchanger;
   a circulation system for circulating a circulating fluid including at least one of the steam or the condensed water between the first heat exchanger and the second heat exchanger;
   a first steam system that supplies the steam to the circulation system;
   a steam extraction system that extracts the steam from the circulation system;
   a pressure gauge that measures a pressure of the circulation system; and
   a flow rate adjustment valve, disposed in the steam extraction system, that adjusts a flow rate of the steam flowing through the steam extraction system based on the pressure measured by the pressure gauge,
   wherein the second heat exchanger includes an interior space for storing the condensed water which has flowed through the circulation system.

2. The gasification gas treatment facility according to claim 1, comprising:
   a condensed water system for extracting the condensed water from the circulation system, wherein the first steam system includes a first flow rate adjustment valve, and wherein the condensed water system includes a second flow rate adjustment valve.

3. The gasification gas treatment facility according to claim 1, comprising:
   a third heat exchanger, disposed upstream of the second heat exchanger, for producing steam by heat exchange with the gasification gas; and
   a second steam system for supplying the steam produced in the third heat exchanger to a steam utilizing facility.

4. The gasification gas treatment facility according to claim 3,
   wherein the steam utilizing facility includes the first heat exchanger.

5. The gasification gas treatment facility according to claim 1,
   wherein a temperature of the condensed water produced by the heat exchange in the first heat exchanger to produce the steam is at least 5° C. higher than a deposition temperature of ammonium chloride.

6. A gasification gas treatment method for treating a gasification gas obtained by gasification of a fuel, comprising:
   in a cleaning facility, producing a purified gas by making the gasification gas come into contact with scrubbing water;
   in a first heat exchanger, a first heat exchange step of performing heat exchange between the purified gas and steam;
   in a second heat exchanger, a second heat exchange step of performing heat exchange between the gasification gas and at least condensed water produced by the heat exchange in the first heat exchange step;
   a circulation step of supplying a circulating fluid including at least the condensed water or the steam between the first heat exchanger and the second heat exchanger;
   producing steam by a first steam system;
   supplying the produced steam to the circulation system from the first steam system;
   extracting the steam from the circulation system with a steam extraction system;
   measuring a pressure of the circulation system with a pressure gauge; and
   adjusting a flow rate of the steam flowing through the steam extraction system, with a flow rate adjustment valve disposed in the steam extraction system, based on the pressure measured by the pressure gauge,
   wherein the condensed water from the circulation step is stored in an interior space of the second heat exchanger.

7. The gasification gas treatment method according to claim 6,
   wherein the second heat exchanger includes a housing having the interior space for storing the condensed water, and a heat transfer tube through which the gasification gas flows, the heat transfer tube being exposed to the interior space, and
   wherein the gasification gas treatment method comprises:
     a condensed water production step of producing condensed water by heat exchange with steam in the first heat exchanger; and
     a storage step of storing the condensed water produced in the condensed water production step in the interior space of the second heat exchanger up to a reference water level.

8. The gasification gas treatment method according to claim 6,
   wherein the circulation step includes controlling an amount of the circulating fluid flowing through a circulation system so that a pressure of the circulation system is equal to or greater than a reference pressure.

* * * * *